United States Patent [19]

Lerat

[11] Patent Number: 4,639,140
[45] Date of Patent: Jan. 27, 1987

[54] OPTICAL SURFACE PROXIMITY MEASURING DEVICE AND ITS APPLICATION TO THE PLOTTING OF THE PROFILE OF A SURFACE

[75] Inventor: Bernard Lerat, Igny, France

[73] Assignee: Commissariat a l'Energie Atomique, Paris, France

[21] Appl. No.: 705,734

[22] Filed: Feb. 26, 1985

[30] Foreign Application Priority Data

Feb. 29, 1984 [FR] France .................. 84 03168

[51] Int. Cl.⁴ .............................................. G01B 11/24
[52] U.S. Cl. ........................................ 356/376; 356/4; 356/375
[58] Field of Search .................. 356/4, 373, 375, 376, 356/371; 250/201, 201 AF, 201 DF, 201 PF, 561

[56] References Cited

U.S. PATENT DOCUMENTS

| | | | |
|---|---|---|---|
| 3,719,421 | 3/1973 | Poilleux et al. | 356/4 |
| 3,885,872 | 5/1975 | Howe, Jr. et al. | 356/4 |
| 3,986,774 | 10/1976 | Lowrey, Jr. et al. | 356/4 |
| 4,088,408 | 5/1978 | Burcher et al. | 356/376 |
| 4,298,286 | 11/1981 | Maxey et al. | 356/381 |
| 4,355,904 | 10/1982 | Balasubramanian | 356/376 |
| 4,548,504 | 10/1985 | Morander | 356/376 |

FOREIGN PATENT DOCUMENTS

| | | | |
|---|---|---|---|
| 3110073 | 9/1982 | Fed. Rep. of Germany. | |
| 111708 | 7/1983 | Japan | 356/371 |
| 59-04 | 1/1984 | Japan | 356/375 |
| 868341 | 9/1981 | U.S.S.R. | 356/375 |

*Primary Examiner*—F. L. Evans
*Attorney, Agent, or Firm*—Michael N. Meller

[57] ABSTRACT

The invention relates to an optical device for measuring the surface proximity and to its application in the plotting of a profile.

The device comprises a radiation emitter forming a light spot on the surface and two detectors, which are sensitive to the light flux reflected by the surface. A pair of focusing elements having different focal lengths are associated with the detectors. The ratio between the signals supplied by the detectors is determined by a processing circuit. This ratio is used to calculate the distance independently of the angle of incidence of the incident beam and the reflection coefficient of the surface.

11 Claims, 7 Drawing Figures

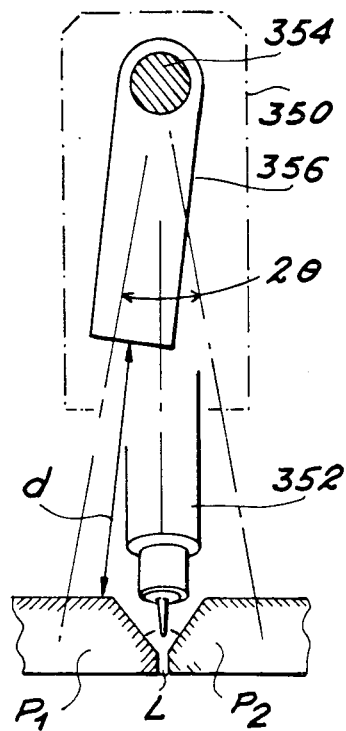
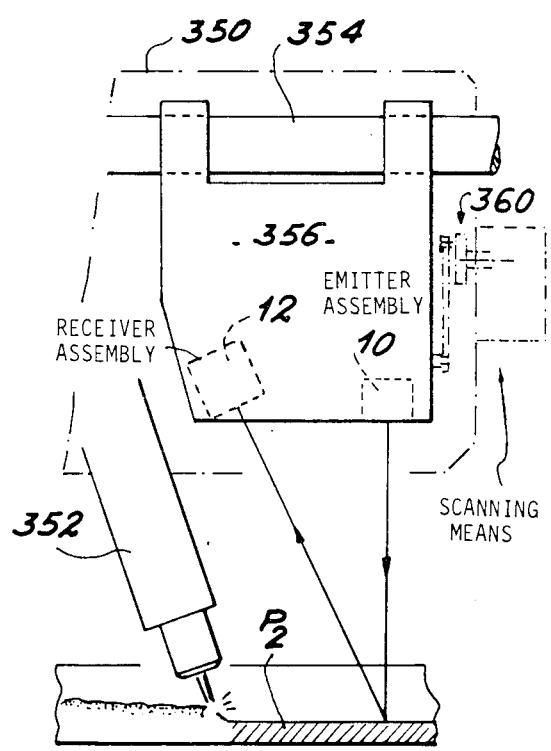
FIG.6a
FIG.6b

OPTICAL SURFACE PROXIMITY MEASURING DEVICE AND ITS APPLICATION TO THE PLOTTING OF THE PROFILE OF A SURFACE

BACKGROUND OF THE INVENTION

The present invention relates to an optical device for use in measuring the proximity or nearness of a surface. The invention also relates to the application of such a device to the plotting or surveying of the profile or contour of a surface.

Such devices are used in numerous fields and in particular for controlling robots, which automatically perform certain tasks. They make it possible to obtain instantaneous information on the relative position of a member relative to a surface and, if appropriate, the profile of the surface. The movements of the robot, as well as the function fulfilled by the robot, can consequently be automatically adapted at all times to the working conditions which can evolve over a period of time.

When they are used for plotting the profile of a surface, such optical devices are advantageously used in adoptive welding robots, as well as in computer-assisted welding. Thus, these two procedures make it necessary to know the spatial position and also certain geometrical parameters of the welded joint. This knowledge is obtained as a result of proximity measuring devices and profile plotting devices.

The prior art optical surface proximity devices are of two different types.

A first group of known optical sensors utilizes the so-called triangulation principle. According to this principle, a light beam is transmitted obliquely towards the surface to be detected, in order to form a light spot thereon. The beam reflected and/or diffused by the surface of focused, in order to form the image of the spot on a position finding detector. The latter can in particular comprise a camera with a charge transfer device. Such an optical sensor is marketed by the Swedish company SELCOM under the trade name OPTOCATOR.

Like all optical devices, said device requires no material contact with the surface to be detected. Moreover, its operating distance with respect to the surface (called the flight height) is satisfactory. Finally, this optical sensor is protected against electrical interference, which is highly prejudicial in certain applications and particularly in the case of welding.

However, triangulation sensors also suffer from the disadvantage of using a complex, costly position finding detector. In addition, they have a relatively limited passband.

There are also infrared optical sensors, in which the infrared radiation emitted by a light-emitting diode is reflected by the surface onto a detector, such as a photodiode or phototransistor. The detector supplies an analog signal representative of the light flux reflected by the target and in particular the distance between the sensor and the target. These infrared sensors are simpler and less expensive than triangulation sensors, whilst they also have a wider passband.

However, the responses of these sensors vary with the surface reflection coefficient and with the angle of incidence of the incident beam on said surface. Thus, they are difficult to use when the surface state of the part and/or its orientation relative to the sensor vary, which is generally the case in robotics.

The present invention specifically relates to an optical surface proximity measuring device similar to the second type of existing optical sensors described hereinbefore but which, contrary to the latter, makes it possible to measure the distance separating the sensor from the facing surface independently of the reflection coefficient of said surface and the angle of incidence. As in the case of all optoelectronic sensors, the sensor according to the invention also has the advantage, compared with optical triangulation sensors, of replacing a complex, costly detector by a bottom range optical detector, whilst also increasing the passband.

SUMMARY OF THE INVENTION

The present invention therefore specifically relates to an optical surface proximity measuring device comprising a radiation emitter forming a light spot on said surface and a receiver which is sensitive to the light flux reflected by the surface through a focusing means, wherein the receiver comprises two detectors associated with two focusing means having different focal lengths, as well as means for determining the value of the relationship between the light fluxes measured by each of the detectors, said value being used to calculate the distance separating the device from the surface.

Thus, according to the invention, a signal is obtained which represents the distance and which is independent both of the surface reflection coefficient and of the angle of incidence of the beam emitted by the emitter.

In the definition of the invention as given hereinbefore and as given in the remainder of the description, the expression "light flux reflected by the surface" can either designate the beam reflected by the surface and/or the beam diffused by the surface.

According to a first aspect of the invention, the incident beam is a parallel beam, such that the dimensions of the spot are independent of the distance separating the emitter from the surface. If it is also assumed that the optical axes of the incident beam and the beam reflected onto the receiver by the surface coincide, the light flux variations measured by the detectors are then directly derived from the variations in the distance separating the surface from the focusing means associated therewith.

According to a second aspect of the invention, the incident beam is a convergent beam. The dimensions of the spot on the surface then vary when the distance separating the emitter from the surface varies. In the aforementioned cast, i.e., the optical axes of the incident beam and the beam reflected by the surface coincide, this phenomenon is added to the first-mentioned phenomenon. The light flux measured by the detectors then results from the simultaneous variation of the distances between the surface and the focusing means associated with the emitter, on the one hand, and between the surface and the detector, on the other hand.

According to a third aspect of the invention, which is combined with one or the other of the two aspects referred to hereinbefore, the emitter beam is angularly displaced relative to the beam reflected by the surface. Apart from the phenomena referred to hereinbefore, an increase in the distance between the detectors and the surface then has the effect of a lateral displacement of the beam reflected by the surface with respect to the detectors, a variable part of said beam being received on said detectors of finite surface area. This effect is added to the aforementioned phenomena. The variation in the light flux received by the detectors resulting from the variation in the distance between the surface and the detectors can be still faster.

Preferably, the measuring device according to the invention also comprises means for controlling the intensity of the radiation emitted by the emitter as a function of the light flux measured by one of the detectors, so that said flux remains constant. Furthermore, the determination of the value of the relationship between the light fluxes measured by each of the detectors is facilitated.

The noise resulting from the ambient radiation can be eliminated by equipping the device with at least one filter associated with the detectors and centered on the emission wavelength. Moreover, means can be provided for modulating the radiation emitted by the emitter to a given frequency and for demodulating the signal supplied by each of the detectors at said frequency.

According to a first embodiment of the invention, the device also comprises a semitransparent plate positioned between said surface and one of the detectors in order to deflect part of the light flux towards the other detector.

According to another embodiment of the invention, the two detectors are arranged on either side of the emitter, the optical axes of the emitter and the detectors being positioned in the same plane and the normal to the surface being located in a plane passing through the optical axis of the emitter and perpendicular to the plane defined by the optical axes of the emitter and the detectors.

According to a particularly interesting application of the invention, the proximity measuring device as defined hereinbefore can be associated with means for scanning the profile of a surface by said device, in order to realize an optical device for plotting said profile.

BRIEF DESCRIPTION OF THE DRAWINGS

The invention is described in greater detail hereinafter relative to non-limitative embodiments and the attached drawings, wherein:

FIGS. 6a and 6b are, respectively a front view and a side view, showing the application of such a proximity measuring device to the checking of the profile of the surfaces of two members to be welded, during the automatic welding thereof.

DETAILED DESCRIPTION OF THE PREFERRED EMBODIMENTS

Figure 1:
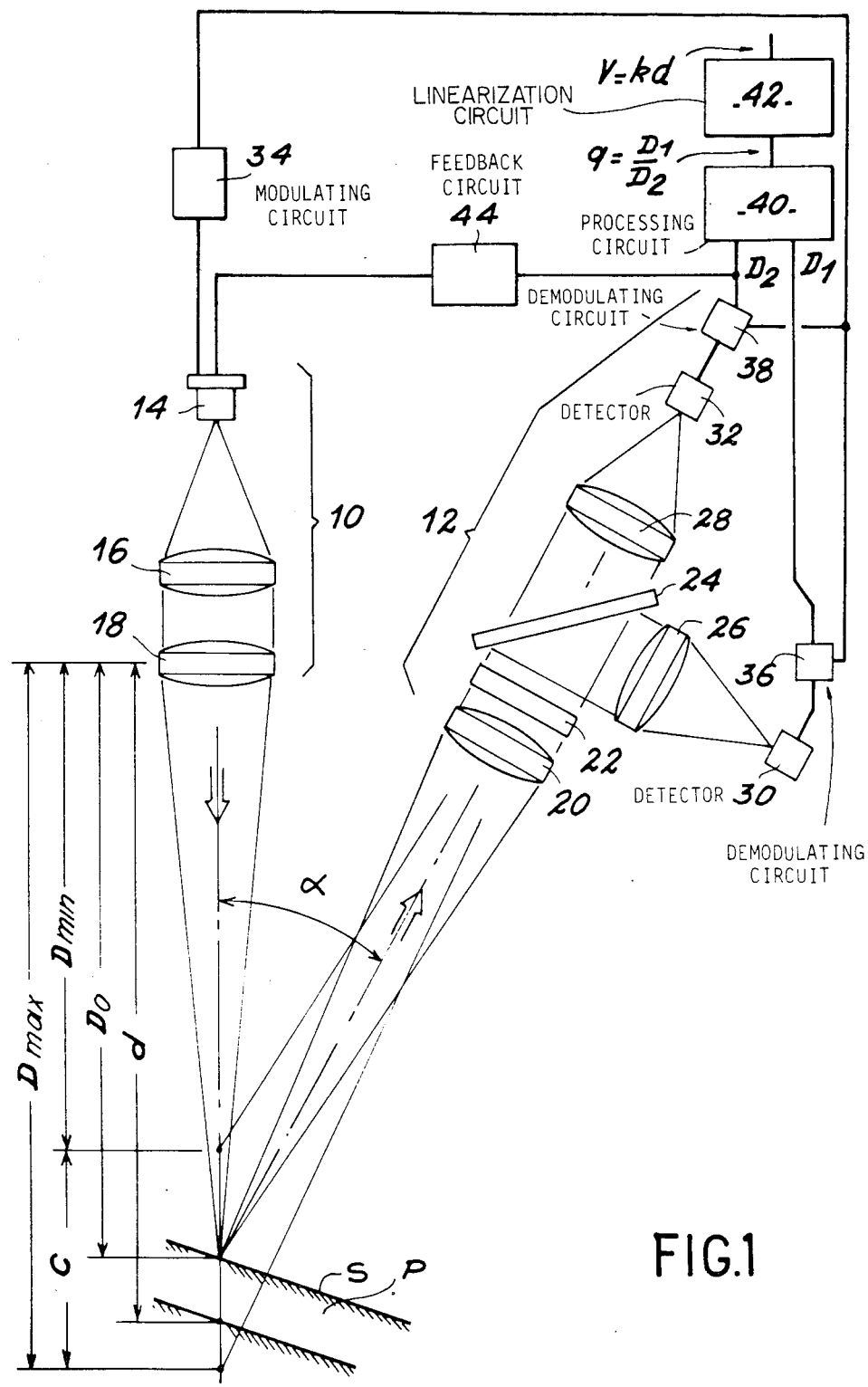
FIG. 1 shows diagrammatically a first embodiment of the distance measuring device according to the invention.

As illustrated in FIG. 1, the device according to the invention comprises an emitter assembly 10 and a receiver assembly 12, all positioned in a case (not shown).

The emitter assembly 10 comprises a light-emitting diode (LED) or a laser diode 14 and two focusing lenses 16, 18. These two lenses make it possible to focus the radiation emitted by the laser diode at a distance $D_0$ from lens 18. As a non-limitative illustration, it should be noted that the convergent beam focused by lenses 16, 18 can define a focusing distance $D_0$ of approximately 150 mm for a convergence angle of approximately 10°.

The emitter 14 is chosen in accordance with the application in question and e.g. emits infrared radiation between 830 and 850 nm.

In the embodiment shown in FIG. 1, the receiver assembly 12 comprises a lens 20, an interference filter 22, a semitransparent plate 24, two lenses 26, 28 and two detectors 30, 32. Detectors 30 and 32 are photovoltaic detectors supplying a voltage signal proportional to the light flux impinging thereon.

For reasons which become apparent in the remainder of the description, lenses 26 and 28, respectively associated with detectors 30 and 32, have different focal lengths. However, the focal lengths of lenses 18 and 20 can be identical.

The optical axes defined by the emitter assembly 10 and by the receiver assembly 12 form between them an angle $\alpha$ and its influence on the value of the light flux received by each of the detectors will become apparent hereinafter.

In the improved embodiment shown in FIG. 1, the amplitude of the light beam supplied by emitter 14 is modulated by a circuit 34 to a given constant frequency, e.g. 40 kHz. Conversely, the electrical signals supplied by each of the detectors 30, 32 are demodulated in appropriate circuits, respectively designated by reference numerals 36, 38. The demodulation frequency of the signal supplied by the detectors is the same as the modulation frequency of the incident beam and is supplied by modulator 34. In the previously calculated example, this frequency is 40 kHz. In parallel, the interference filter 22 is centered on the wavelength of the radiation emitter by emitted 14.

These two combined characteristics make it possible to overcome background noise resulting from the ambient radiation. It should be noted that the protection of the proximity measuring device according to the invention against ambient radiation is particularly important in the application of such a device to plotting the profile of a surface in a welding robot.

According to an essential feature of the invention, signals $D_1$ and $D_2$ supplied by each of the sensors 30 and 32 and demodulated by circuits 36, 38 are input into a processing circuit 40, which determines the ratio q between these signals. As will become apparent hereinafter, through analyzing the operation of the device according to the invention, ratio q is solely a function of the distance d separating the reference point of the device, such as lens 18, from the surface S of member p.

In order to facilitate its subsequent exploitation, signal q is linearized in a conventional linearization circuit 42 supplying an output signal V, so that $V=k \cdot d$, k being a constant. This signal V, which varies linearly with distance d, can be directly used or can be used for controlling a feedback according to the envisaged application.

Preferably, and as is also illustrated in FIG. 1, a feedback circuit 44 is provided between the emitter 14 and one of the detectors. In the represented embodiment, said detector is detector 32. Circuit 44 makes if possible to control the amplitude of the control signal of emitter 14 in such a way that the flux received by detector 32 remains constant, no matter what the operating conditions. Moreover, the processing circuit 40 can be simplified, because the divisor of the division $q=D_1/D_2$ remains constant.

All the electronic circuits 34, 36, 38, 40, 42 and to 44 are conventional, well-known circuits, so that no detailed description will be given here.

An explanation will now be given of the operation of the surface proximity measuring device according to the invention, with reference to FIGS. 1 to 4.

As the orientation of member P is of a random nature, the emitter assembly 10 projects a light spot onto the surface S of said member. The incident beam is reflected from said surface, on which there is generally also a diffusion of the projected radiation.

Part of the beam reflected by surface S of part P reaches detectors 30, 32 by way of the different optical components of the receiver assembly 12. In view of the fact that the focal lengths of lenses 26, 28 differ, the light spots in the planes of the detectors have different diameters, i.e. the respective detectors receive different light fluxes.

Figure 2:
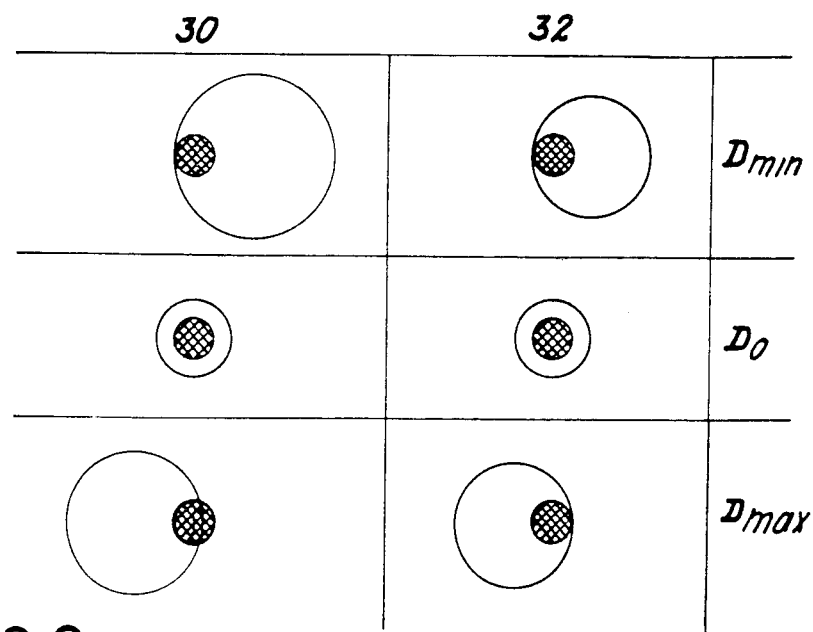
FIG. 2 shows diagrammatically, in the form of a table, the position of the beam reflected by the surface relative to each of the detectors of the device of FIG. 1, upon varying the distance between the device and the surface.

FIG. 2 shows in tabular form the positions of the light spots formed at each of the detectors 30, 32 on the light-sensitive surface $S_d$ thereof, for three different positions of surface S with respect to the device.

More specifically, the constant light-sensitive surface $S_d$ of each of the detectors 30 and 32 is represented by a small hatched circle. The surfaces at the detectors on which the light spots impinge are defined by the large non-hatched circles.

In FIG. 2, the relative positions of these two surfaces are represented for each of two detectors and for the following three characteristic positions of the device of FIG. 1:

distance d is equal to a minimum distance $D_{min}$ corresponding to the lower limit of the range of the device, distance d is equal to the mean reference distance $D_0$ for which the radiation emitted by emitter 14 is focused on the surface of member P; and distance d is equal to a maximum distance $D_{max}$ corresponding to the maximum range limit of the sensor.

As illustrated in FIG. 1, the measuring range C is defined between values $D_{min}$ and $D_{max}$ of distance d, said values being defined in an approximate and not strict manner.

Upon studying FIG. 2 in greater detail, it can firstly be seen that for the reference distance $D_0$, the surface areas of the light spots level with detectors 30 and 32 are equal to or exceed the area of the light-sensitive surfaces of the detectors.

Moreover, it can be seen that on moving away from said distance $D_0$ in one the other direction, two phenomena are superimposed. The variation of d compared with $d_0$ leads to defocusing and consequently to an increase in the surface areas of the light spots at the detectors. If this first phenomenon is considered in isolation, the light flux received by each detector will consequently decrease when the distance d moves in one or other direction away from the reference distance $D_0$. The variation in one the other direction of distance d leads to a displacement of the center of the light spots impinging on the detectors with respect to the light-sensitive surface $S_d$ of each of detectors. This phenomenon is due to the angular displacement $\alpha$ between the optical axes of the incident beam and the beam reflected by the surfaces. If considered in isolation, this displacement of the light spots also leads to a reduction in the light flux received by each detector as the variation of d from reference distance $D_0$ increases. However, this reduction in the immediate vicinity of distance $D_0$ is only sensitive to the condition that the surfaces of the light spots are substantially identical to those of the sensitive surfaces of the detectors when distance d is equal to $D_0$.

These two phenomena are combined in the embodiment described hereinbefore with reference to FIG. 1. Therefore, the responses of these two detectors 30, 32 vary as a function of distance d. However, it is readily apparent that the invention is not limited to the simultaneous exploitation of these two phenomena in the same device and in fact also relates to comparable devices involving only one of these phenomena.

Thus, a further embodiment not shown according to the invention can be realized in such a way that the incident beam and the beam reflected by the surface have coinciding optical axes. For example, this result can be obtained with the aid of semireflecting plates by making use of techniques which are well known to those having ordinary skills in optics. However, it is pointed out that such a device suffers from the disadvantage, as compared with that of FIG. 1, that the semireflecting plates decrease the useful light energy level 1 by a factor of four as compared with the level of the signal emitted by the source and that parasitic radiation appearing by reflection and diffusion at the plate reflecting the incident beam towards the surface can bring about a deterioration in the signal-to-noise ratio. Only the first aforementioned phenomenon is involved in the device of the invention.

A more detailed analysis of this first phenomenon shows that the useful light energy level is decreased by a factor of two. Thus, in the optical assembly described with reference to FIG. 1, any variation in one the other direction of distance d compared with distance $D_0$ leads both to a defocusing of the spot formed on the surface S by the incident beam and a defocusing of the image of said spot impinging on detectors 30 and 32. It is therefore obvious that the defocusing effect with respect to the detectors persists when the cross sectional area of the spot formed by the incident beam does not vary with distance d, i.e. when the incident beam is a parallel beam.

In a further embodiment, (not shown) the device according to the invention thus comprises an emitter assembly emitting an incident parallel beam. This result can easily be obtained by a practitioner having ordinary skill in the art using appropriate optics.

Obviously, this embodiment also has two variants. According to a first variant, the incident and reflected beams have two coinciding optical axes. However, according to the second variant, the optical axes of the two beams are angularly displaced.

Figure 3:
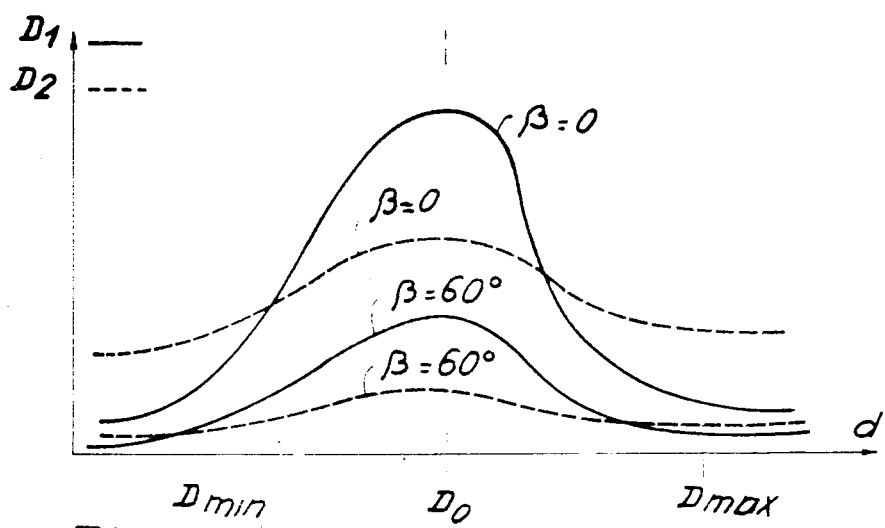
FIG. 3 shows in a response curve of each of the detectors of the device of FIG. 1, as a function of the distance d separating the device from the surface, for different values of the incidence angle $\beta$ of the incident beam relative to the surface.

FIG. 3 shows in respectively continuous and broken line form, the responses of detectors 30 and 32 as a function of distance d, when the incidence angle $\beta$ of the incident beam with respect to the surface S is zero and when said angle is equal to 60°. All these curves were plotted for a member P, whose surface has a reflection coefficient η of 0.7.

Examination of the curves of FIG. 3 reveals that if the responses of the detectors are indeed a function of distance d, as the analysis of FIG. 2 has shown, they are also dependent on the incidence angle β. Moreover, on plotting the response curves of the detectors for different values of reflection coefficient η, it can be seen that the responses of the detectors are also a function of this reflection coefficient. More detailed observation of these curves shows that they are homothetic compared with the axis of the abscissas, whatever the reflection coefficient η and the incidence angle β.

Figure 4:
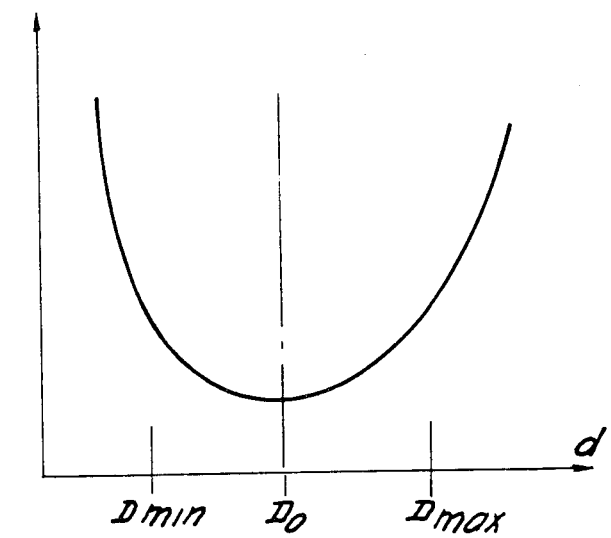
FIG. 4 graphically depicts the variations of the quotient q of the signal supplied by each of the detectors, as a function of the distance d between the device and the surface.

Therefore, the division of the signals $D_1$ and $D_2$ supplied by detectors 30 and 32 by the electronic processing circuit 40 results in an output signal $q=D_1/D_2$, which is a function of distance d, as illustrated by FIG. 4. The curve $q=f(d)$ is a non-linear function, so that signal q is linearized by circuit 42 to supply a linear signal $V=k\cdot d$, as indicated hereinbefore. Thus, the device according to the invention makes it possible to perform a contact-free measurement of distance d.

Obviously, although interference filter 22, modulation circuit 34 and demodulation circuits 36, 38 make it possible to protect the device from ambient radiation, they are not indispensable to the invention and can be eliminated in certain special applications in which said radiation is negligible. Moreover, the feedback circuit 44 can be eliminated in a simplified device.

Figure 5:
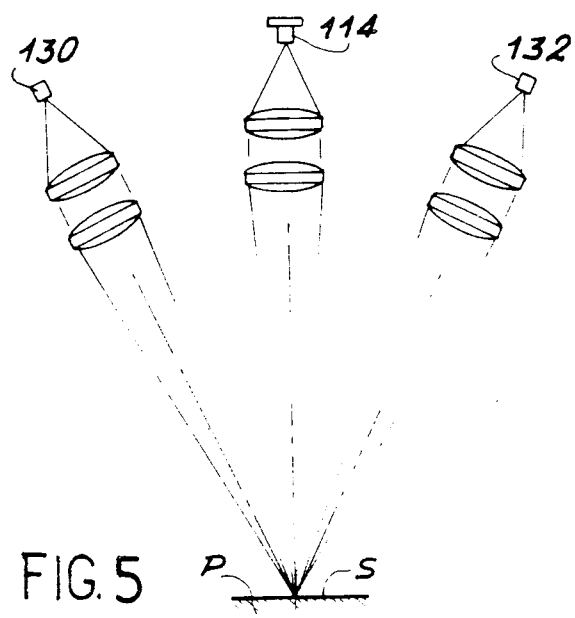
FIG. 5 shows diagrammatically another embodiment of the proximity measuring device according to the invention, in which two detectors are placed on either side of the emitter.

FIG. 5 shows another embodiment of the device according to the invention, which essentially differs from that of FIG. 1 as a result of the arrangement of the detectors. Thus, in the device shown in FIG. 5, the two detectors 130 and 132 are arranged symmetrically with respect to the optical axis of the incident beam emitted by emitter 114. For simplification purposes, the electronic part of the device, which can be identical to that of the embodiment of FIG. 1, has not been shown.

In this configuration, the signals supplied by the detectors are comparable to those supplied by detectors 30 and 32 in the embodiment of FIG. 1, provided that the normal to the surface S of member P is in a plane containing the optical axis of emitter 114 and is perpendicular to the plane defined by the optical axes of the emitter and the detectors.

This embodiment has the advantage of being sensitive to the surface state of the member at the light spot and is able to supply information on the roughness or the local reflection coefficient. This information is obtained by processing the alternating component of the measuring signal, the direct component remaining a function of the distance.

Obviously, with the exception of semireflecting plate 24, all the optical and electronic elements described hereinbefore with reference to FIG. 1 also apply to this embodiment.

Thus, FIGS. 6a and 6b diagrammatically show, in a non-limitative manner, a particularly interesting application of the device according to the invention to the plotting of the profile of a surface associated with a welding robot. Reference numeral 350 designates the head of a welding robot supporting a welding torch 352.

In this application of the invention, head 350 has a spindle 354 positioned above the surface of members $P_1$ and $P_2$ to be welded so as to be substantially parallel to the junction line L formed between these parts and having an axis in the vertical plane of the welding torch 352. As illustrated in FIGS. 6a and 6b, spindle 354 pivotably supports the case 356 of the proximity measuring device according to the invention.

Obviously, this device can be constructed in accordance with any of the previously described embodiments. FIGS. 6a and 6b show in exemplified manner the case where the device is that described with reference to FIG. 1. Thus, it is possible to see the emitter assembly 10 and the receiver assembly 12.

Device 356 is supported by spindle 354 in such a way that the incident beam strikes members $P_1$ and $P_2$ in front of the traveling welding torch 352, as illustrated in FIG. 6b.

Scanning means 360, such as an electrical, hydraulic, pneumatic or similar motor brings about an oscillation of device 356 about spindle 354, so that the incident and reflected beams scan the profile of the welding zone slightly upstream of the torch. This displacement corresponds to an angle 2θ, which is approximately centered with respect to the vertical plane passing through the junction line L. The voltage V supplied by the proximity measuring device represents the distance d, so that its changes during the displacement in accordance with angle 2θ represents the profile of the surfaces of members $P_1$ and $P_2$ on either side of line L.

In a variant (not shown) of the device illustrated by FIGS. 6a and 6b, the scanning of the surface with the aid of the proximity measuring device is carried out by different means. These means comprise guidance rails permitting a linear displacement of the case transverse with respect to the joint and means such as a motor or jack for controlling this displacement. Thus, an angular scan is replaced by a linear scan.

In another constructional variant (not shown), the mechanical scan obtained with the aid of the mechanism diagrammatically shown in FIGS. 6a and 6b is replaced by an optical scan using known light beam deflection means. Such an optical scan makes it possible to reach higher frequencies than a mechanical scan.

It is clear that the information supplied by such a device makes it possible, with the aid of appropriate data processing, to correct the trajectory of the welding torch during welding, control during the welding process the parameters such as the material quantity to be supplied during a pass, plotting the section to be filled, or position the welding passes with respect to one another during a multipass welding operation.

Obviously, this application is in no way limitative. Thus, it is possible to envisage the use of the proximity measuring device according to the invention for dimensionally checking a member during its manufacture. As soon as the distance passes outside a predetermined tolerance range, this is detected by the device according to the invention and defective parts can be automatically rejected.

What is claimed is:

1. An optical surface proximity measuring device comprising a radiation emitter supplying an incident light beam forming a light spot on a surface, a receiver comprising first and second detectors respectively measuring light fluxes returned by said surface from said light spot through first and second focusing means respectively arranged between said surface and said first and second detectors, said first and second focusing means having different focal lengths, wherein said device further comprises processing means connected to said first and second detectors, said processing means supplying an output signal having a value equal to the ratio between the light fluxes measured by said first and second detectors, said value being a function of the distance separating the device from said surface.

2. A device according to claim 1, wherein the light spot is formed on the said surface by a parallel incident beam.

3. A device according to claim 1, wherein the light spot is formed on said surface by a convergent incident beam.

4. A device according to claim 1, wherein the light spot is formed on said surface by an incident beam angularly displaced with respect to the beam reflected by said surface.

5. A device according to claim 1, wherein it also comprises control means for the intensity of the radiation emitted by the emitter, as a function of the light flux measured by one of the detectors, in order that said flux remains constant.

6. A device according to claim 1, further comprising at least one filter arranged between said surface and said first and second focusing means, said filter being centered on the wavelength of the radiation emitted by said emitter.

7. A device according to claim 1, wherein it also comprises means for modulating the radiation emitted by the emitter to a given frequency and means for demodulating the signal supplied by each of the said detectors of said frequency.

8. A device according to claim 1, wherein it also comprises a semitransparent plate positioned between said surface and one of the detectors, in order to deflect part of the light flux towards the other detector.

9. A device according to claim 1, wherein the two detectors are arranged symmetrically with respect to the optical axis of the emitter, the normal to the surface being located in a plane passing through the optical axis of the emitter and perpendicular to the plane defined by the optical axes of the emitter and the detectors.

10. An optical device for measuring the proximity of a surface comprising:
    (a) a radiation emitter directed such that emitted radiation impinges on said surface;
    (b) first and second detectors having radiation-sensitive surfaces for outputting a voltage signal in proportion to the flux of the radiation impinging thereon, said first and second detectors being positioned to receive radiation returned from said surface;
    (c) a first focusing means interposed between said first detector and said surface, said first focusing means having a first focal length;
    (d) a second focusing means interposed between said second detector and said surface, said second focusing means having a second focal length different than said first focal length; and
    (e) processing means connected to receive voltage signals from said first and second detectors for calculating the distance from said optical device to said surface,
    wherein said distance is calculated using the ratio of a first voltage signal output by said first detector to a second voltage signal simultaneously output by said second detector, said first and second voltage signals being a function of the light flux detected respectively by said first and second detectors in response to emitted radiation returned from said surface.

11. An optical device for plotting the profile of a surface, comprising a surface proximity measuring device having a radiation emitter supplying an incident light beam forming a light spot on a surface, a receiver comprising first and second detectors respectively measuring light fluxes returned by said surface from said light spot through first and second focusing means respectively arranged between said surface and said first and second detectors, said first and second focusing means having different focal lengths, wherein said device further comprises processing means connected to said first and second detectors, said processing means supplying an output signal having a value equal to the ratio between the light fluxes measured by said first and second detectors, said value being a function of the distance separating the device from said surface and means for bringing about a scan of the profile of said surface by said surface proximity measuring device.

* * * * *